(12) United States Patent
Sharma et al.

(10) Patent No.: US 10,136,278 B2
(45) Date of Patent: Nov. 20, 2018

(54) OFFLINE CHARGING FOR GROUP COMMUNICATIONS USING MULTIMEDIA BROADCAST MULTICAST SERVICE (MBMS) DELIVERY

(71) Applicant: Alcatel-Lucent USA Inc., Murray Hill, NJ (US)

(72) Inventors: Ranjan Sharma, New Albany, OH (US); Yigang Cai, Naperville, IL (US)

(73) Assignee: Nokia of America Corporation, Murray Hill, NJ (US)

( * ) Notice: Subject to any disclaimer, the term of this patent is extended or adjusted under 35 U.S.C. 154(b) by 262 days.

(21) Appl. No.: 14/641,207

(22) Filed: Mar. 6, 2015

(65) Prior Publication Data
US 2016/0261971 A1    Sep. 8, 2016

(51) Int. Cl.
*H04W 4/00* (2018.01)
*H04W 4/24* (2018.01)
*H04M 15/00* (2006.01)
*H04W 4/70* (2018.01)
*H04L 12/14* (2006.01)
*H04L 29/06* (2006.01)
(Continued)

(52) U.S. Cl.
CPC ........... *H04W 4/24* (2013.01); *H04L 12/1403* (2013.01); *H04L 12/1425* (2013.01); *H04L 63/0435* (2013.01); *H04L 63/065* (2013.01); *H04M 15/41* (2013.01); *H04M 15/59* (2013.01); *H04M 15/65* (2013.01); *H04W 4/005* (2013.01); *H04W 4/70* (2018.02); *H04W 12/02* (2013.01); *H04L 12/1435* (2013.01); *H04M 15/765* (2013.01); *H04M 15/8066* (2013.01); *H04M 15/8077* (2013.01); *H04W 4/06* (2013.01)

(58) Field of Classification Search
None
See application file for complete search history.

(56) References Cited

U.S. PATENT DOCUMENTS

2006/0009247 A1* 1/2006 Kelley .................. H04L 63/062
                                                  455/515
2009/0264097 A1* 10/2009 Cai ........................ G06Q 30/04
                                                  455/406

(Continued)

OTHER PUBLICATIONS

3rd Generation Partnership Project; Group Communication System Enablers for LTE (GCSE_LTE); 3GPP TS 23.468 V12.3.0 (Dec. 2014).

(Continued)

*Primary Examiner* — Anh-Vu Ly
*Assistant Examiner* — Hector Reyes Ortiz
(74) *Attorney, Agent, or Firm* — Duft & Bornsen, PC

(57) ABSTRACT

Systems and methods for performing offline charging for group communications. One embodiment is an application server that identifies data for a group communication, identifies an encryption code assigned to the group, encrypts the data for the group communication using the encryption code, and initiates delivery of the encrypted data for the group communication to the group of mobile devices over an MBMS bearer. The application server collects charging information related to the group communication using MBMS delivery, formats the charging information into an offline charging communication, and transmits the offline charging communication to an offline charging system.

18 Claims, 4 Drawing Sheets

(51) Int. Cl.
*H04W 12/02* (2009.01)
*H04W 4/06* (2009.01)

(56) References Cited

U.S. PATENT DOCUMENTS

| | | | |
|---|---|---|---|
| 2015/0119023 A1* | 4/2015 | Wang | H04W 4/06 455/432.1 |
| 2015/0200965 A1* | 7/2015 | Jerichow | H04L 63/20 726/1 |
| 2016/0007138 A1* | 1/2016 | Palanisamy | H04W 4/005 455/41.2 |
| 2016/0119762 A1* | 4/2016 | Zhu | H04W 4/10 370/312 |
| 2016/0182244 A1* | 6/2016 | Shrader | H04L 12/1845 370/312 |

OTHER PUBLICATIONS

3rd Generation Partnership Project; Telecommunication management; Charging management; Multimedia Broadcast and Multicast Service (MBMS) charging; 3GPP TS 32.273 V13.0.0 (Dec. 2014).
3rd Generation Partnership Project; Telecommunication management; Charging management; Diameter charging applications; 3GPP TS 32.299 V12.7.0 (Dec. 2014).
3rd Generation Partnership Project; Multimedia Broadcast/Multicast Service (MBMS); Architecture and functional description; 3GPP TS 23.246 V12.4.0 (Dec. 2014).

* cited by examiner

OFFLINE CHARGING FOR GROUP COMMUNICATIONS USING MULTIMEDIA BROADCAST MULTICAST SERVICE (MBMS) DELIVERY

FIELD OF THE INVENTION

The invention is related to the field of communication systems and, in particular, to charging for group communications using Multimedia Broadcast Multicast Service (MBMS) delivery.

BACKGROUND

MBMS is a point-to-multipoint service in which data is transmitted from a single source entity to multiple recipients, as described in 3GPP TS 23.246 (v12.4.0). Transmitting the same data to multiple recipients allows network resources to be shared in the radio access network and/or the core network. MBMS offers two modes: broadcast mode and multicast mode. In broadcast mode, a source entity uses network resources to transmit content within a service area that is received by all mobile devices in the service area. In multicast mode, a source entity uses network resources to transmit content to specific mobile devices within a service area.

A Broadcast Multicast Service Center (BM-SC) is an entity that provides functions for MBMS user service provisioning and delivery. The BM-SC may serve as an entry point for content provider MBMS transmissions, may authorize and initiate MBMS bearer services, and may schedule and deliver MBMS transmissions. To charge for MBMS transmission, the BM-SC includes a Charging Trigger Function (CTF) that provides charging information to an offline charging system (OFCS).

The 3GPP has also defined a Group Communication Service (GCS) to transmit application signaling and data to members of a group, as described in 3GPP TS 23.268 (v12.3.0). For example, a source entity may define a group of twenty members, and the source entity may use the GCS to send content to the members of the group. GCS may use Evolved Packet System (EPS) bearer services or MBMS bearer services to deliver the application signaling and/or data to the members of the group. However, the 3GPP has not adequately described how to charge for group communications that utilize MBMS bearer services.

SUMMARY

Embodiments described herein provide an offline charging mechanism for group communications that utilize MBMS bearer services. When a group communication is established using MBMS delivery, a GCS application server (AS) encrypts the data (or application signaling) for the group communication according to an encryption code. The mobile devices in the group have the encryption code and are able to decode the group communication. The GCS AS is also able to trigger a charging message for the group communication, and transmit the charging message to the OFCS. Therefore, the OFCS can charge for the group communication based on the information from the GCS AS. For example, the OFCS may charge the recipients of the group communication (e.g., per-user), the content provider that provides data for the group communication, and/or the group.

One embodiment comprises an application server configured to control a group communication to a group of mobile devices using MBMS delivery. The application server includes a controller configured to identify data for the group communication, to identify an encryption code assigned to the group, to encrypt the data for the group communication using the encryption code, and to initiate delivery of the encrypted data for the group communication to the group of mobile devices over an MBMS bearer. The controller is configured to collect charging information related to the group communication using MBMS delivery, to format the charging information into an offline charging communication, and to transmit the offline charging communication to an offline charging system.

In another embodiment, the controller is configured to identify the mobile devices in the group, to identify the mobile devices located in a service area defined for the group communication, and to include identifiers for the mobile devices located in the service area within the charging information.

In another embodiment, the controller is configured to communicate with the offline charging system over a Diameter Rf interface, and one or more Attribute Value Pairs (AVPs) are defined in the Diameter Rf interface for the charging information related to the group communication.

In another embodiment, the AVP(s) include an AVP defined for the identifier assigned to the group, an AVP defined for a charging mode indicating at least one party responsible for charges for the group communication, an AVP defined for a data volume of the group communication, an AVP defined for a start time for the group communication using MBMS delivery, and an AVP defined for a stop time for the group communication using MBMS delivery.

In another embodiment, the controller is configured to communicate with the offline charging system over a Ga interface by sending a Charging Data Record (CDR), and one or more fields of the CDR are defined for the charging information related to the group communication.

In another embodiment, the controller is configured to pre-provision the mobile devices in the group with the encryption code.

In another embodiment, the encryption code is mapped to a service area defined for the group communication within a mobile network.

In another embodiment, the controller is configured to assign a validity timer to the encryption code.

In another embodiment, the mobile devices comprise Machine-Type Communication (MTC) devices.

Another embodiment comprises a method for implementing offline charging for a group communication to a group of mobile devices using MBMS delivery. The method includes identifying data (at the application server) for the group communication, identifying an encryption code assigned to the group, encrypting the data for the group communication using the encryption code, and initiating delivery of the encrypted data for the group communication to the group of mobile devices over an MBMS bearer. The method further includes collecting charging information related to the group communication using MBMS delivery, formatting the charging information into an offline charging communication, and transmitting the offline charging communication from the application server to an offline charging system.

Another embodiment comprises an OFCS configured to communicate with an application server that controls a group communication to a group of mobile devices using MBMS delivery. The OFCS is configured to receive an offline charging communication from the application server that includes charging information for the group communication, to determine whether charging applies to the mobile devices in the group, to identify the mobile devices in the group that received the group communication, and to generate a CDR for each of the mobile devices that received the group communication responsive to a determination that charging applies to the mobile devices.

In another embodiment, the controller in the OFCS is configured to identify the mobile devices located in a service area defined for the group, and to generate the CDR for each of the mobile devices located in the service area without generating a CDR for the mobile devices located outside of the service area.

In another embodiment, the controller in the OFCS is configured to parse the offline charging communication to identify a group identifier assigned to the group, and to query a Home Subscriber Server (HSS) with the group identifier to identify the mobile devices located in the service area.

In another embodiment, the controller in the OFCS is configured to determine whether charging applies to a source entity that provides data for the group communication, to generate a single CDR for the source entity, to identify the mobile devices located in a service area defined for the group, and to insert an indication of the mobile devices located in the service area into the single CDR.

In another embodiment, the controller in the OFCS is configured to determine whether charging applies to the group or a sub-group, and to generate a single CDR for the group or sub-group.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
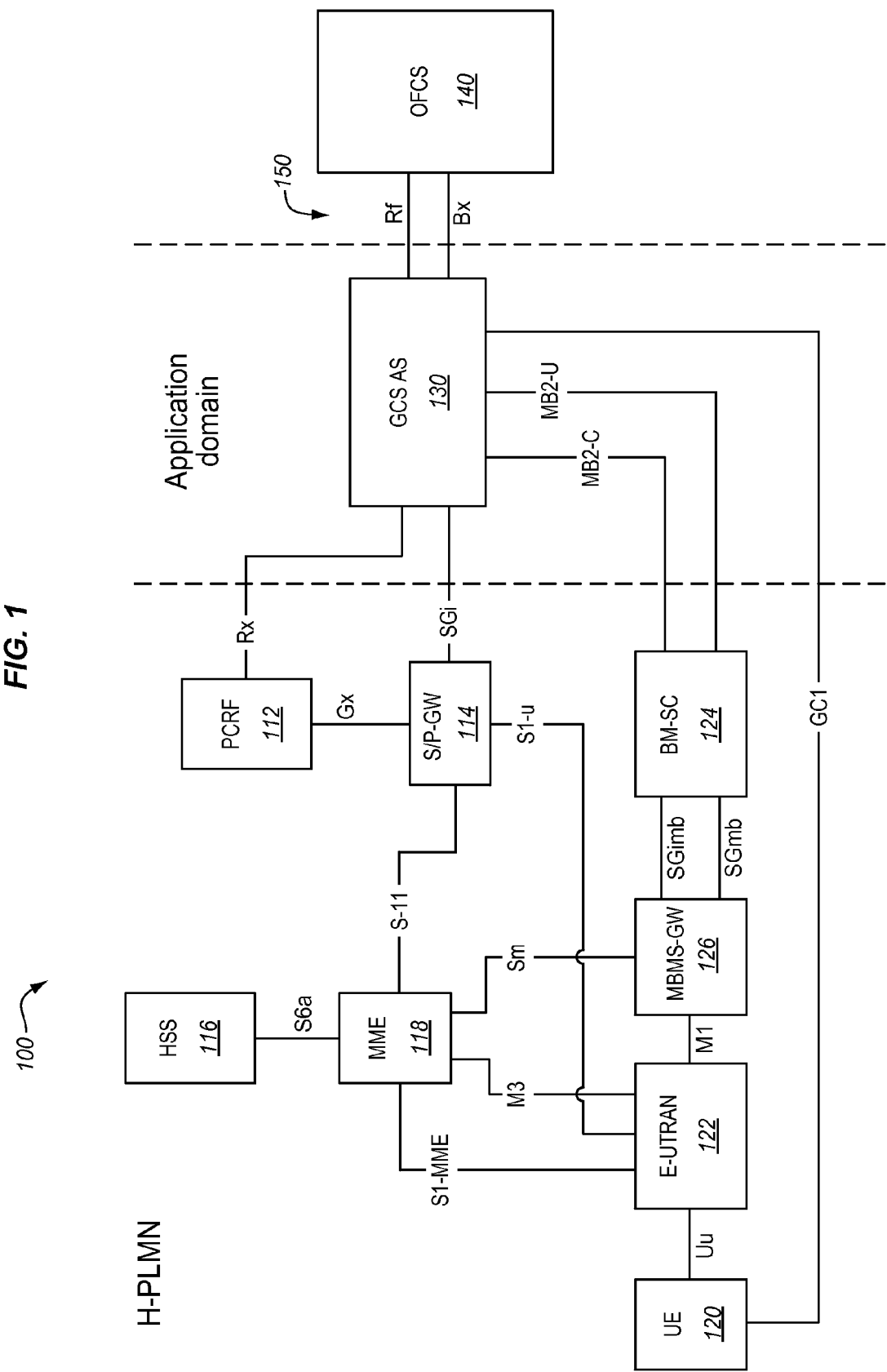
FIG. 1 illustrates a non-roaming architecture that provides group communications in an exemplary embodiment.

FIG. 1 illustrates a non-roaming architecture 100 that provides group communications (e.g., GCS) in an exemplary embodiment. Architecture 100 includes a home Public Land Mobile Network (hPLMN) that includes a Policy and Charging Rules Function (PCRF) 112, a Serving Gateway (S-GW)/Packet Data Network Gateway (P-GW) 114, a Home Subscriber Server (HSS) 116, and a Mobility Management Entity (MME) 118. These elements represent at least part of the core network of the hPLMN. The elements of the core network communicate with User Equipment (UE) 120 of an end user through a Radio Access Network (RAN), which is indicated as an Evolved-UMTS Terrestrial Radio Access Network (E-UTRAN) 122. Although not shown in FIG. 1, E-UTRAN 122 includes a plurality of eNodeBs that provide wireless connections between UE 120 (and other UEs) and the core network. UE 120 comprises any device (e.g., mobile device or mobile terminal) that is enabled for MBMS bearer services. One example of UE 120 is a Machine-Type Communication (MTC) device. Although one UE 120 is illustrated in FIG. 1, there may be many UEs in communication with hPLMN that are enabled for a group communication through MBMS delivery.

In order to provide MBMS, the hPLMN also includes a Broadcast Multicast Service Center (BM-SC) 124 and a MBMS gateway (MBMS-GW) 126. BM-SC 124 is an entity that provides functions for MBMS user service provisioning and delivery. BM-SC 124 may serve as an entry point for content provider MBMS transmissions, may authorize and initiate MBMS bearer services, and may schedule and deliver MBMS transmissions. MBMS-GW 126 is an entity that interfaces BM-SC 124 with E-UTRAN 122. The functions of MBMS-GW 126 include providing an interface for entities using MBMS bearers through the SGi-mb (user plane) reference point, providing an interface for entities using MBMS bearers through the SGmb (control plane) reference point, IP multicast distribution of MBMS user plane data to eNodeBs (M1 reference point), and IP multicast distribution of MBMS user plane data to RNCs (M1 reference point). MBMS-GW 126 may be stand alone or co-located with other network elements, such as BM-SC 124. The term "MBMS" as used herein also refers to evolved MBMS (eMBMS).

Architecture 100 also includes an application domain for implementing GCS. The application domain includes a GCS application server (GCS AS) 130. GCS AS 130 comprises any server, device, apparatus, or equipment (including hardware) that is used to implement group communications. GCS AS 140 may not be associated with any PLMN (regardless of the subscription of the UEs that use it), and may be a third party application server. GCS AS 130 may use EPS bearer services and MBMS bearer services for transferring application signaling and data to a group of UEs. In the uplink direction, UE 120 uses an EPS bearer service to exchange application signaling with GCS AS 130 or when it wants to send data to GCS AS 130. In the downlink direction, GCS AS 130 may transfer application signaling and data to UE 120 through individual EPS bearer services and/or an MBMS bearer service.

UE 120 registers with GCS AS 130 using application signaling for participating in one or multiple GCS groups. When MBMS bearer service is used, GCS AS 130 may transfer data from different GCS groups over a single MBMS broadcast bearer. The application signaling and data transferred via MBMS bearer(s) are transparent to BM-SC 124 and the MBMS bearer service. GCS AS 130 provides UE 120 with configuration information that it uses to receive application data via MBMS bearer services and to handle that data appropriately. MBMS bearer services are offered in service areas (e.g., a cell or collection of cells) of a PLMN. When UE 120 moves between areas where MBMS broadcast bearers are available or not, UE 120 informs GCS AS 130 via application signaling of MBMS broadcast bearer reception to non-reception, or vice versa. GCS AS 130 activates or deactivates the downlink application signaling and data transfer via individual EPS bearer(s) as appropriate. To accomplish service continuity, UE 120 may temporarily receive the same GCS application signaling and data in parallel via EPS bearer(s) and MBMS service(s).

The architecture shown in FIG. 1 illustrates a non-roaming scenario. However, there may be other architectures applicable to the embodiments described herein, such as a roaming architecture. Other architectures are shown in 3GPP TS 23.468 (v12.3.0), which is incorporated by reference as if fully included herein.

Architecture 100 is enhanced in this embodiment to implement offline charging for group communications. Therefore, architecture 100 further includes an Offline Charging System (OFCS) 140 that is in communication with GCS AS 130. OFCS 140 comprises a server, device, apparatus, or equipment (including hardware) that provides offline charging for group communications and/or other types of communications. Offline charging is a process where charging information for resource usage is collected concurrently with resource usage. Offline charging can be of two types: session-based or event-based. In event-based charging, a Charging Trigger Function (CTF) reports the usage or service rendered where the service offering is rendered in a single operation. For example, the CTF may report the usage in an Accounting Request (ACR) EVENT. Session-based charging is the process of reporting usage for a service, and uses START, INTERIM, and STOP accounting data. During a service, a CTF may transmit multiple ACR Interims depending on the proceeding of the session.

An interface 150 or reference point is defined between GCS AS 130 and OFCS 140. Interface 150 as described herein allows GCS AS 130 to provide offline charging information to OFCS 140 that is related to a group communication. For example, interface 150 may comprise a Diameter Rf interface that is enhanced with one or more new Attribute Value Pairs (AVPs) that are defined for charging information related to a group communication. In another example, interface 150 may represent the Ga reference point, and one or more new fields may be defined in a CDR for charging information related to a group communication. A CDR is a formatted collection of information about one or more chargeable event(s) for use in billing and accounting.

Figure 2:
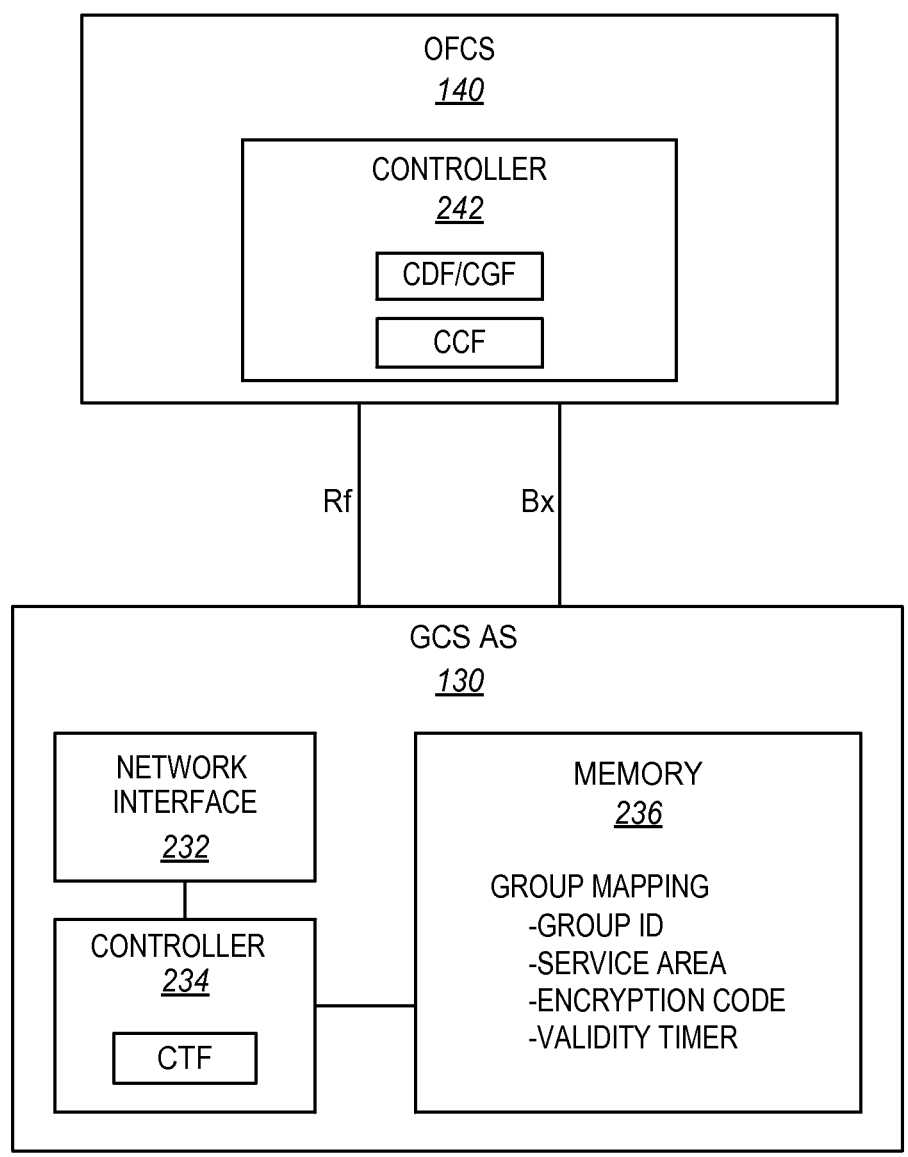
FIG. 2 is a schematic diagram of a GCS AS and an OFCS in an exemplary embodiment.

FIG. 2 is a schematic diagram of GCS AS 130 and OFCS 140 in an exemplary embodiment. In this embodiment, GCS AS 130 includes a network interface 232, a controller 234, and a memory 236. Network interface 232 comprises any device, apparatus, or equipment (including hardware) that is able to communicate with other network elements, such as OFCS 140, HSS 116, BM-SC 124, etc. (see also FIG. 1), over a reference point. Controller 234 comprises any device, apparatus, or equipment (including hardware) that controls the operation of GCS AS 130 for providing a group communication. For example, controller 234 may identify data for a group communication, forward the data for the group communication to BM-SC 124 for broadcast or multicast delivery, and/or forward the data to P-GW 114 for unicast delivery. Controller 234 also implements a CTF for offline charging of group communications. The CTF is a component that detects chargeable events for services, assembles information for the chargeable events into matching charging events, and sends the charging events to a Charging Data Function (CDF) or a Charging Collector Function (CCF). The CTF is configured to trigger on events related to a group communication, to collect information regarding the group communication, and report the information to a charging system. Memory 236 comprises any storage system, such as a hard drive or solid-state memory, that stores data or instructions for use by controller 234.

OFCS 140 includes a controller 242, which comprises any device, apparatus, or equipment (including hardware) that provides the functions of offline charging. Controller 242 may provide one or both of the functions of a Charging Data Function (CDF) and a Charging Gateway Function (CGF). A CDF comprises an element or module that receives charging events from CTFs, formats the charging events into Charging Data Records (CDRs), and sends the CDRs to a CGF. A CGF comprises an element or module within an OFCS that correlates CDRs for a session, and forwards a CDR file with the correlated CDRs to a billing domain for subscriber billing and/or inter-operator accounting. Controller 242 may also provide the function of a Charging Collector Function (CCF). A CCF comprises an element or module that is able to implement the functions of both a CDF and a CGF.

The embodiments described herein relate to group communications (or group messages) using MBMS delivery. It is assumed that a group has been established in some manner. Therefore, a group identifier (ID) is assigned to the group, and the members of the group are identified. For example, the group members may be identified by a public user ID (e.g., directory number, email address, etc.) or a private user ID. The term group "member" may refer to an end user and/or a mobile device (i.e., UE). Also, a service area is assigned to the group. The service area may be a cell indicated by a cell ID, a collection of cells, a location area within a PLMN, a routing area within a PLMN, a tracking area within a PLMN, etc. The information regarding the group may be stored in GCS AS 130, in HSS 116, or in other locations. For example, GCS AS 130 may store a mapping for a group in memory 236. The mapping may include the group ID, the service area for the group, an indication of the members of the group, and other information.

GCS AS 130, as shown in FIG. 1, may also communicate with BM-SC 124 to activate an MBMS bearer for one or more group communications. When GCS AS 130 wants to activate an MBMS bearer (over MB2), GCS AS 130 sends an Activate MBMS Bearer Request to BM-SC 124. BM-SC 124 then allocates MBMS resources to support content delivery of the MBMS bearer to the requested MBMS broadcast area. BM-SC 124 then sends an Activate MBMS Bearer Response to GCS AS 130 indicating the service description, BM-SC IP address and port number for the user-plane, and an expiration time. The service description contains MBMS bearer related configuration information. With an MBMS bearer activated, GCS AS 130 may then initiate a group communication over the MBMS bearer.

Figure 3:
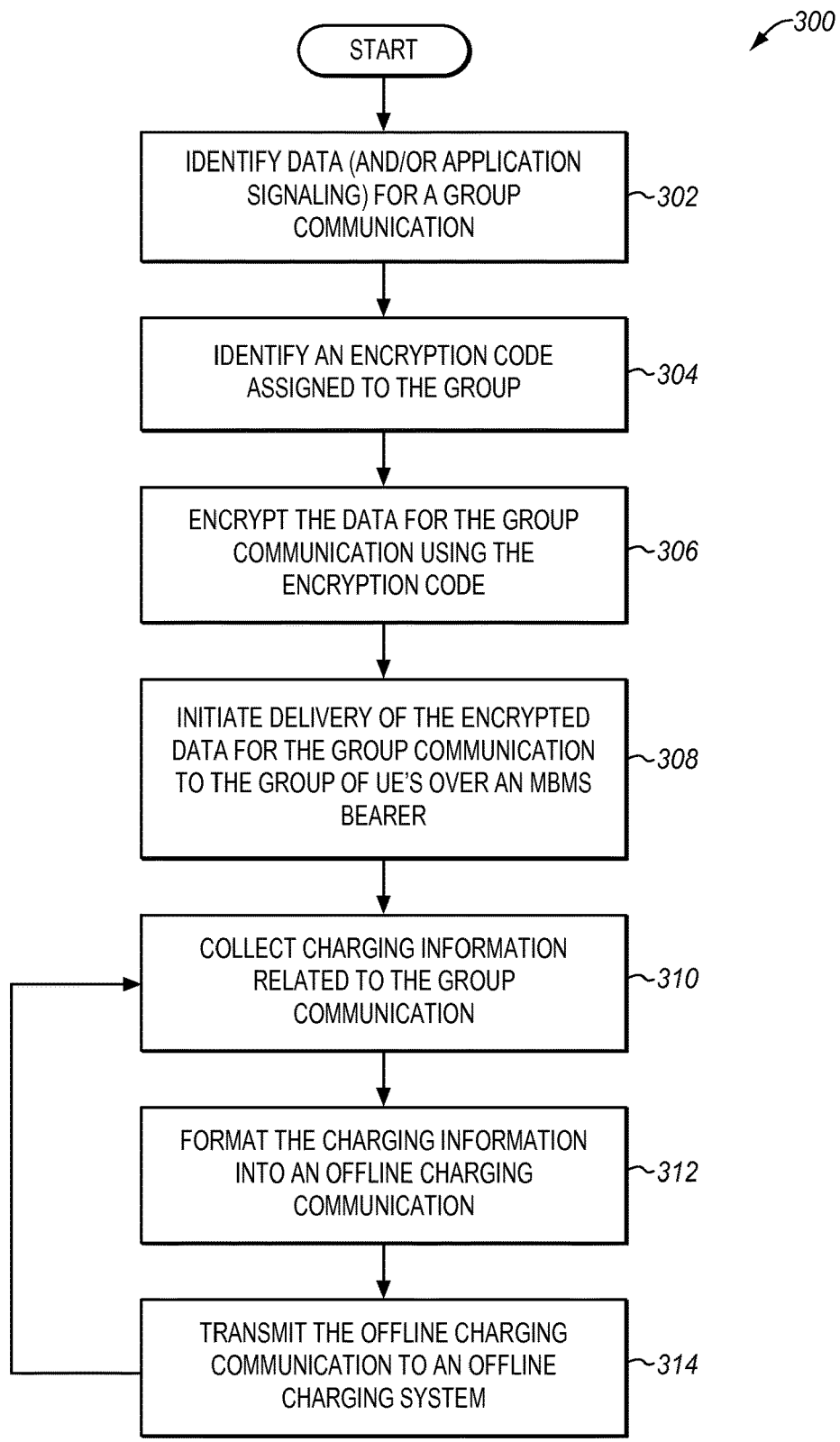
FIG. 3 is a flow chart illustrating a method for initiating and charging for a group communication in an exemplary embodiment.

FIG. 3 is a flow chart illustrating a method 300 for initiating and charging for a group communication in an exemplary embodiment. The steps of method 300 will be described with reference to GCS AS 130 in FIG. 1, but those skilled in the art will appreciate that method 300 may be performed in other systems. Also, the steps of the flow charts described herein are not all inclusive and may include other steps not shown, and the steps may be performed in an alternative order.

Controller 234 in GCS AS 130 identifies data and/or application signaling for a group communication (step 302). For example, GCS AS 130 may receive the data for the group communication from a source entity, such as a server of a content provider. Controller 234 also identifies an encryption code assigned to the group (step 304). The encryption code comprises any information, algorithm, key, etc., used to encrypt/decrypt the data for the group communication. The encryption code is mapped to a group ID, a service area defined for the group communication, etc. Controller 234 may actually generate the encryption code, or may retrieve the encryption code from another element, such as HSS 116. Controller 234 encrypts the data (or application signaling) for the group communication using the encryption code (step 306). With the data encrypted, controller 234 initiates delivery of the encrypted data to the group of UEs (also referred to as mobile devices) over an MBMS bearer that was activated for GCS AS 130 (step 308).

Controller 234 may also assign a validity timer to the encryption code. The validity timer indicates how long the encryption code is valid for the group communication. The validity timer may also be mapped to the group ID within memory 236.

GCS AS 130 (through controller 234) also provisions the UEs in the group with the encryption code (and validity timer) assigned to the group. GCS AS 130 provides a provisioning message to each UE in the group that includes the encryption code for decrypting the data for the group communication, such as over the GC1 reference point. The provisioning message may also include the group ID, a service area for the group, etc. Each UE that receives the provisioning message will be able to decrypt the data for the group communication, assuming they are located in the service area defined for the group communication. Each UE that receives and decrypts the data may provide an acknowledgement back to GCS AS 130.

To charge for the group communication, the CTF in GCS AS 130 is programmed to trigger on certain chargeable events related to group communications. Thus, the CTF triggers on transmission of the group communication. Controller 234 (through the CTF) collects charging information related to the group communication (step 310). The charging information comprises any information that a charging system or billing domain may use to perform offline charging for the group communication. To illustrate examples of the charging information, the CTF may identify a group ID for the group communication, an identity for each of the UEs in the group that received the group communication, a charging mode for the group communication, a volume of the group communication, a start time/end time for the group communication, etc. The charging information may also include an identity for each of the UEs in the group that received the group communication. For example, controller 234 may identify the UEs (i.e., mobile devices) in the group, identify the UEs located in a service area defined for the group communication, and include identifiers for the UEs located in the service area within the charging information. Any other desired information may be collected to charge for the group communication. A more detailed discussion of the charging information is provided later in this specification.

After collecting the charging information, controller 234 formats the charging information into an offline charging communication (step 312). An offline charging communication comprises a message, record, file, etc., that reports the charging information to an OFCS. The type of offline charging communication depends on the interface used between GCS AS 130 and OFCS 140. The offline charging communication may comprise a Diameter Rf Accounting Request (ACR) [Event, Start, Interim, or Stop] or another type of accounting request. Controller 234 may therefore format the charging information related to the group communication into Attribute Value Pairs (AVP) of the ACR. Alternatively, the offline charging communication may comprise a CDR (full or partial). Controller 234 then transmits the offline charging communication to OFCS 140 (step 314).

In order to send this type of charging information to OFCS 140, new AVPs may be defined for the Diameter Rf reference point (also referred to as the Diameter Rf interface) to transport the charging information. The following lists some exemplary AVPs that are newly-defined herein for Diameter Rf.

A new AVP may be defined for an MBMS-Group-Service-Identity associated with the group communication. This AVP serves as an MBMS group or sub-group ID that uniquely identifies the group.

A new AVP may be defined for an MBMS-Group-Service-Charging-Mode. This AVP indicates the charging mode that applies to the group communication. It is assumed that the charging method is "offline", but the group communication may be charged to the content provider for the group communication, the recipients of the group communication, the group as a whole, etc. Therefore, the charging mode may be any of the following: 1) the source entity or content provider for the group communication; 2) individual members or UEs in the group (i.e., the recipients of the group communication); and 3) the group or sub-group. This AVP indicates which entity or entities are responsible for the charges incurred for the group communication.

A new AVP may be defined for MBMS-Volume. This AVP indicates the data volume of the group communication using MBMS delivery for an event or session.

New AVPs may be defined for MBMS-Session-Validity-Start-Time and MBMS-Session-Validity-Stop-Time. The Start-Time AVP indicates a timestamp when an event or session starts for the group communication, and the Stop-Time AVP indicates a timestamp when a session stops for the group communication.

New AVPs may be defined for any other charging information discussed above. Also, because the charging information may be inserted in a CDR, new CDR fields may be defined for any of the charging information discussed above. For example, a new CDR field may be defined in a similar manner as each new AVP described above.

Figure 4:
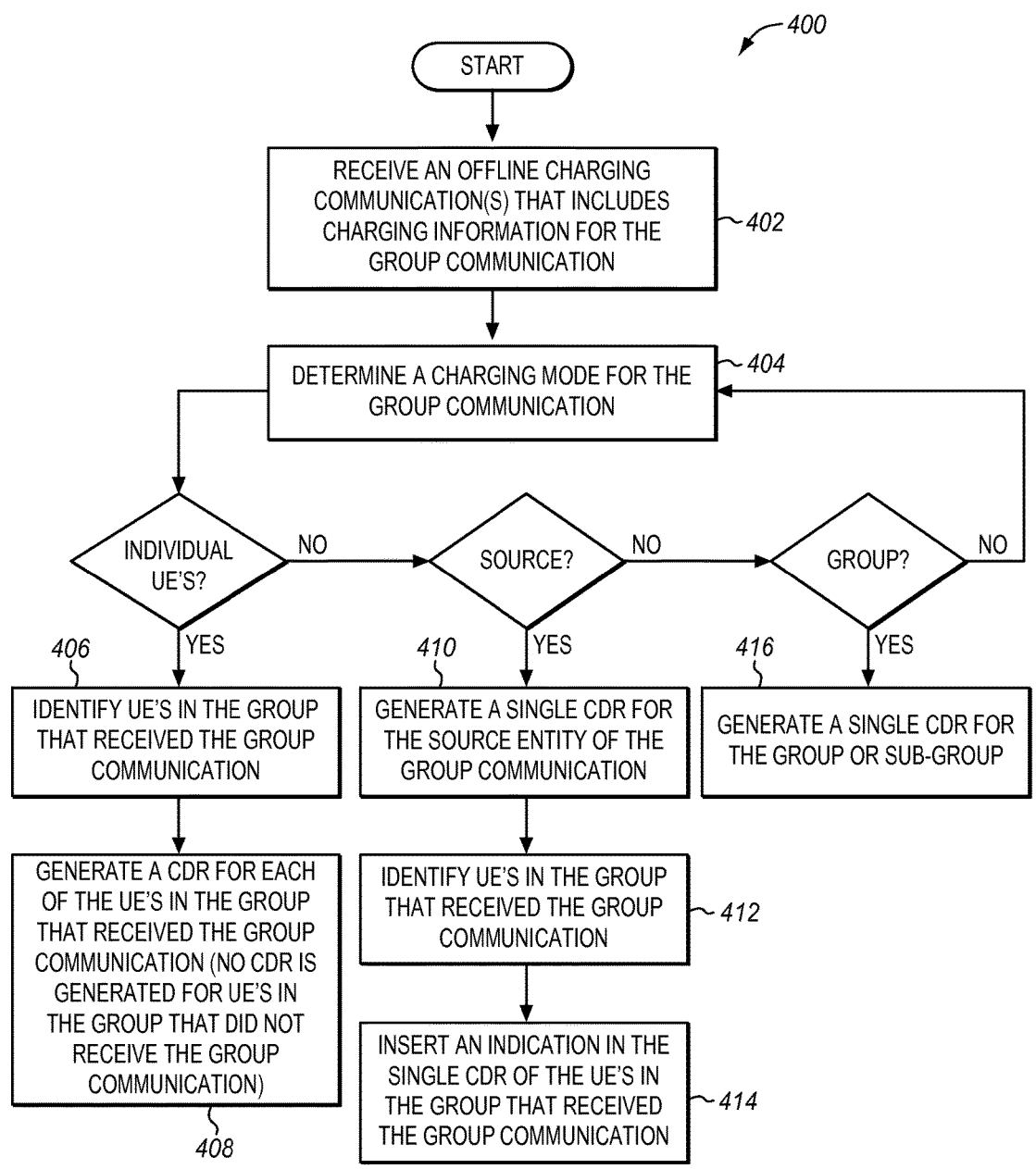
FIG. 4 is a flow chart illustrating a method for implementing offline charging for a group communication in an exemplary embodiment.

When OFCS 140 receives the offline charging communication, it may initiate offline charging for the group communication. FIG. 4 is a flow chart illustrating a method 400 for implementing offline charging for a group communication in an exemplary embodiment. The steps of method 400 will be described with reference to OFCS 140 in FIG. 1, but those skilled in the art will appreciate that method 400 may be performed in other systems.

Controller 242 in OFCS 140 receives the offline charging communication from GCS AS 130 that includes charging information for the group communication (step 402). In this example, it is assumed that the offline charging communication comprises an ACR. Controller 242 parses the offline charging communication to determine a charging mode for the group communication (step 404). If the charging mode indicates that charging applies to the individual members of the group (i.e., the recipients of the group communication are responsible for charges incurred for the group communication), then controller 242 identifies the UEs in the group that received the group communication (step 406). There are different ways of determining which members of the group received the group communication. In one embodiment, controller 242 may assume that every UE received the group communication, which is located in the service area of the group communication. Therefore, controller 242 may identify the members of the group, and then determine which of the members of the group were located in the service area when the group communication occurred. Controller 242 may query HSS 116 with the group ID to determine the members of the group, and which of the members were located in the service area. Controller 242 then generates a CDR for each of the members in the group that received the group communication (step 408). Controller 242 does not generate a CDR for the other members that did not receive the group communication.

If the charging mode indicates that charging applies to the source entity of the group communication (i.e., the content provider that is sending content to the group is responsible for charges incurred for the group communication), then controller 242 generates a single CDR for the group communication (step 410). Controller 242 may also identify the UEs in the group that received the group communication (step 412). As before, controller 242 may identify the members of the group, and then determine which of the members of the group were located in the service area when the group communication occurred. Controller 242 may then insert an indication in the CDR of the members in the group that received the group communication (step 414). Controller 242 may insert an ID in the CDR for each of the members in the group, or controller 242 may insert a number of members that received the group communication in the CDR. That way, the source entity may be charged based on how many members received the group communication.

If the charging mode indicates that charging applies to the group or a sub-group (i.e., an entity that set up the group or manages the group is responsible for charges incurred for the group communication), then controller 242 generates a single CDR for the group communication (step 416). This single CDR indicates the charging information needed to charge the group for the group communication. If there are multiple sub-groups identified, then controller 242 generates a single CDR for each sub-group. For example, some of the UEs in the group may be subscribers of one service provider, and other UEs in the group may be subscribers of another service provider. In this scenario, there is one sub-group identified for one service provider, and another sub-group for the other service provider. Controller 242 then generates a single CDR for each sub-group.

Depending on the charging mode, a data volume may be associated with each CDR individually, or aggregated for the group/sub-group. The data volume may be adjusted for those members that did not receive the group communication.

The embodiments described above advantageously provide a way to charge for group communications that use MBMS delivery. Although a BM-SC is able to generate charging information for MBMS bearers, group communications over the MBMS bearers are transparent to the BM-SC so it was unable to provide charging information at the group level. By generating the charging information at the GCS AS as described in the above embodiments, group communications can be charged even at the user level.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. An apparatus comprising:
an application server configured to control a group communication to a group of mobile devices, wherein the group communication is used to transmit data to members of the group using Multimedia Broadcast Multicast Service (MBMS) delivery, the application server comprising:
    an interface configured to communicate with a Broadcast Multicast Service Center (BM-SC), and configured to communicate with an offline charging system; and
    a controller configured to communicate with the BM-SC via the interface to activate an MBMS bearer for the group communication, to identify data for the group communication, to identify an encryption code assigned to the group, to encrypt the data for the group communication using the encryption code, and to initiate delivery of the encrypted data for the group communication to the members of the group over the MBMS bearer activated for the group communication;
    the controller is configured to collect charging information for the group communication delivered over the MBMS bearer to perform offline charging for the group communication, wherein the charging information includes a charging mode indicating at least one party responsible for charges for the group communication;
    the controller is configured to format the charging information for the group communication into an offline charging communication that reports the charging information for the group communication to the offline charging system, and to transmit the offline charging communication to the offline charging system via the interface.

2. The apparatus of claim 1 wherein:
the controller is configured to identify the mobile devices in the group, to identify the mobile devices located in a service area defined for the group communication, and to include identifiers for the mobile devices located in the service area within the charging information.

3. The apparatus of claim 1 wherein:
a Diameter Rf reference point is defined between the application server and the offline charging system; and
at least one Attribute Value Pair (AVP) is defined in the Diameter Rf reference point for the charging information for the group communication.

4. The apparatus of claim 3 wherein the at least one AVP includes:
an AVP defined for an identifier assigned to the group;
an AVP defined for the charging mode indicating the at least one party responsible for charges for the group communication;
an AVP defined for a data volume of the group communication;
an AVP defined for a start time for the group communication using MBMS delivery; and
an AVP defined for a stop time for the group communication using MBMS delivery.

5. The apparatus of claim 1 wherein:
a Ga reference point is defined between the application server and the offline charging system; and
at least one field of a Charging Data Record (CDR) is defined for the charging information for the group communication.

6. The apparatus of claim 1 wherein:
the controller is configured to pre-provision the mobile devices in the group with the encryption code.

7. The apparatus of claim 1 wherein:
the encryption code is mapped to a service area defined for the group communication within a mobile network.

8. The apparatus of claim 1 wherein:
the controller is configured to assign a validity timer to the encryption code.

9. The apparatus of claim 1 wherein:
the mobile devices comprise Machine-Type Communication (MTC) devices.

10. A method for implementing offline charging for a group communication to a group of mobile devices, wherein the group communication is used to transmit data to members of the group using Multimedia Broadcast Multicast Service (MBMS) delivery, the method comprising:
communicating, at an application server, with a Broadcast Multicast Service Center (BM-SC) to activate an MBMS bearer for the group communication;
identifying data at the application server for the group communication;
identifying, at the application server, an encryption code assigned to the group;
encrypting the data for the group communication using the encryption code;
initiating, at the application server, delivery of the encrypted data for the group communication to the members of the group over the MBMS bearer activated for the group communication;
collecting, at the application server, charging information for the group communication delivered over the MBMS bearer to perform offline charging for the group communication, wherein the charging information includes a charging mode indicating at least one party responsible for charges for the group communication;
formatting the charging information for the group communication into an offline charging communication that reports the charging information for the group communication to an offline charging system; and
transmitting the offline charging communication from the application server to the offline charging system.

11. The method of claim 10 wherein collecting charging information comprises:
identifying the mobile devices in the group;
identifying the mobile devices located in a service area defined for the group communication; and
including identifiers for the mobile devices located in the service area within the charging information.

12. The method of claim 10 wherein:
a Diameter Rf reference point is defined between the application server and the offline charging system; and
at least one Attribute Value Pair (AVP) is defined in the Diameter Rf interface for the charging information for the group communication.

13. The method of claim 12 wherein the at least one AVP includes:
an AVP defined for an identifier assigned to the group;
an AVP defined for the charging mode indicating the at least one party responsible for charges for the group communication;
an AVP defined for a data volume of the group communication;
an AVP defined for a start time for the group communication using MBMS delivery; and
an AVP defined for a stop time for the group communication using MBMS delivery.

14. The method of claim 10 wherein:
a Ga reference point is defined between the application server and the offline charging system; and
at least one field of a Charging Data Record (CDR) is defined for the charging information for the group communication.

15. The method of claim 10 further comprising:
pre-provisioning the mobile devices in the group with the encryption code.

16. The method of claim 10 wherein:
the encryption code is mapped to a service area defined for the group communication within a mobile network.

17. The method of claim 10 further comprising:
assigning a validity timer to the encryption code.

18. The method of claim 10 wherein:
the mobile devices comprise Machine-Type Communication (MTC) devices.

* * * * *